(12) United States Patent
Xiao et al.

(10) Patent No.: US 9,451,097 B2
(45) Date of Patent: Sep. 20, 2016

(54) SELECTIVELY AND DYNAMICALLY PROVIDING TOLL-FREE DATA SERVICES

(71) Applicant: Verizon Patent and Licensing Inc., Arlington, VA (US)

(72) Inventors: Hong Xiao, Acton, MA (US); Fengping Zhang, Burlington, MA (US); Dongchen Wang, Concord, MA (US); Andre R. Turner, Belmont, MA (US); Azim Nasir, Foxboro, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 40 days.

(21) Appl. No.: 14/340,005

(22) Filed: Jul. 24, 2014

(65) Prior Publication Data

US 2016/0028899 A1    Jan. 28, 2016

(51) Int. Cl.
*H04M 15/00* (2006.01)
*G06Q 30/02* (2012.01)

(52) U.S. Cl.
CPC ............ *H04M 15/68* (2013.01); *H04M 15/09* (2013.01); *H04M 15/58* (2013.01); *H04M 15/81* (2013.01); *G06Q 30/0208* (2013.01); *H04M 15/80* (2013.01); *H04M 2215/0192* (2013.01)

(58) Field of Classification Search
CPC ..... H04M 15/68; H04M 15/81; H04M 15/09; H04M 15/58
USPC .............................................. 455/406; 705/14
See application file for complete search history.

(56) References Cited

U.S. PATENT DOCUMENTS

| | | | |
|---|---|---|---|
| 2009/0198602 A1* | 8/2009 | Wang | G06Q 40/00 705/35 |
| 2012/0330737 A1* | 12/2012 | Liberty | G06Q 30/0208 705/14.17 |
| 2014/0120867 A1* | 5/2014 | Hodges | G06Q 30/00 455/406 |

* cited by examiner

*Primary Examiner* — Charles Appiah
*Assistant Examiner* — Margaret G Mastrodonato

(57) ABSTRACT

A device may determine a campaign rule for providing a toll-free data service to a mobile device associated with a user. The campaign rule may identify a condition for charging a service provider, associated with the toll-free data service, for data used by the mobile device in association with the toll-free data service. The device may determine an efficiency metric associated with the user. The efficiency metric may be determined based on providing toll-free data services to the user or a set of users associated with a demographic with which the user belongs. The device may analyze the efficiency metric based on the campaign rule. The device may selectively provide the toll-free data service to the mobile device, associated with the user, based on analyzing the efficiency metric.

20 Claims, 12 Drawing Sheets

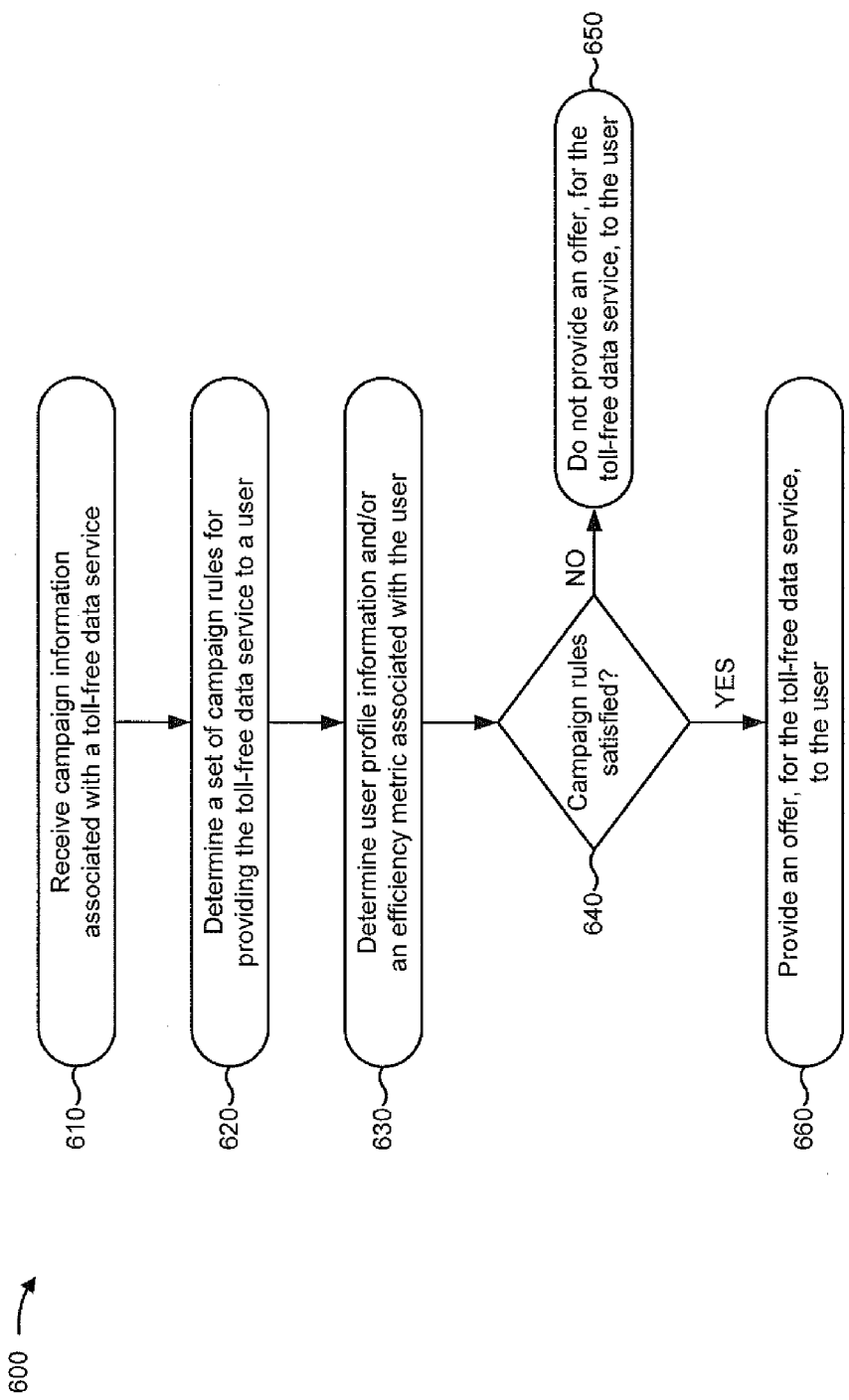

SELECTIVELY AND DYNAMICALLY PROVIDING TOLL-FREE DATA SERVICES

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a service provider that provides the toll-free data service, rather than to an end user that uses the toll-free data service.

BRIEF DESCRIPTION OF THE DRAWINGS

FIG. 6 is a flow chart of an example process for selectively and dynamically providing a toll-free data service.

DETAILED DESCRIPTION OF PREFERRED EMBODIMENTS

The following detailed description of example implementations refers to the accompanying drawings. The same reference numbers in different drawings may identify the same or similar elements.

A toll-free data service may refer to a service where a network operator charges data usage (e.g., byte usage) to a service provider that provides the toll-free data service, rather than to an end user that uses a mobile device to access the toll-free data service. A service provider may set up a toll-free data service campaign that describes parameters of a toll-free data service, such as a total amount of data (e.g., a maximum amount) that may be charged to the service provider in association with the toll-free data service. A service provider may want to provide the toll-free data service to target users that are likely to increase service provider revenues (e.g., users who are likely to make purchases as a result of receiving the toll-free data service). Implementations described herein assist in targeting particular users to be provided with a toll-free data service, determining a toll-free data service to be provided to target users, and dynamically adjusting target users to which a toll-free data service is to be provided.

Figure 1:
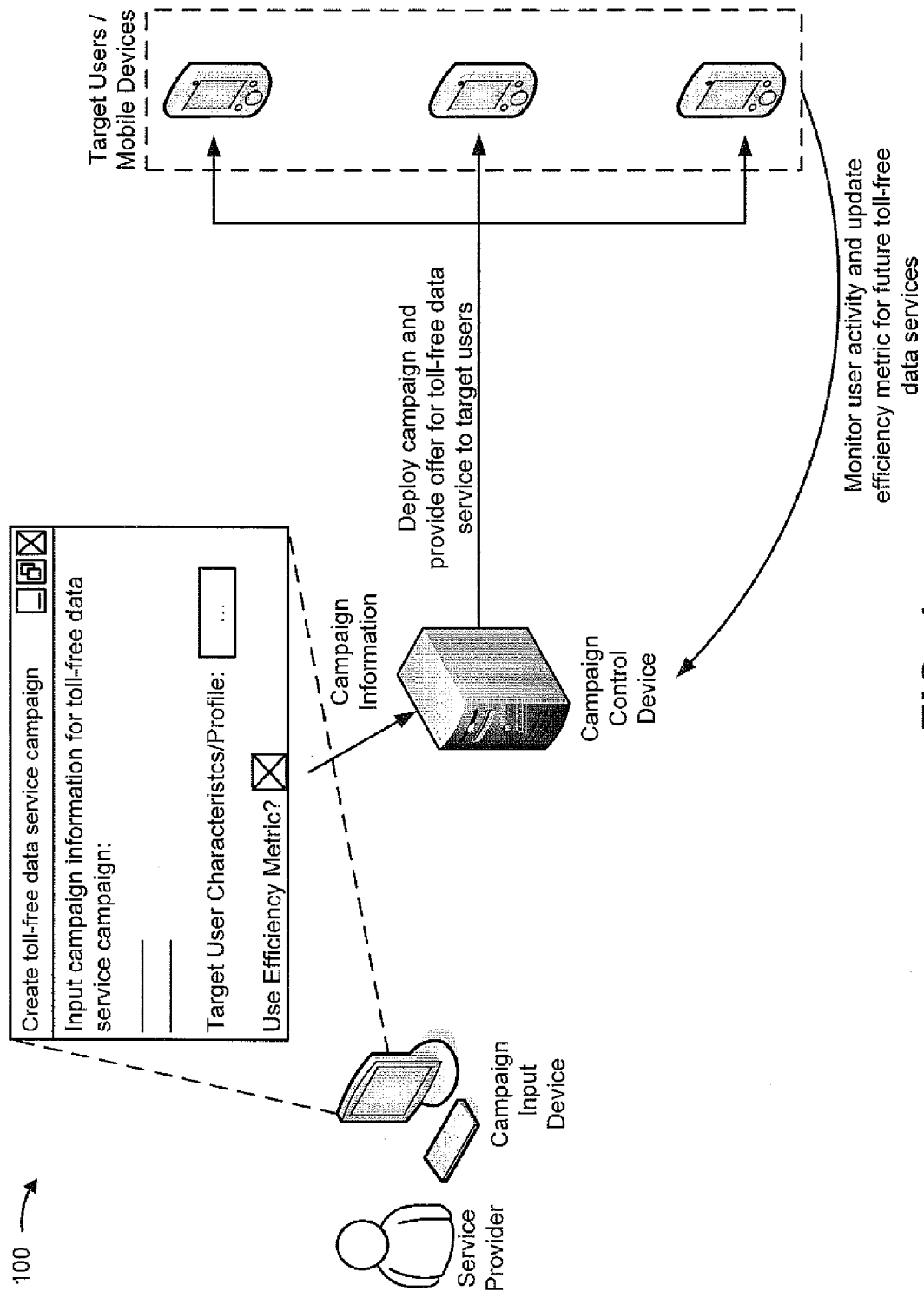
FIG. 1 is a diagram of an overview of an example implementation described herein.

FIG. 1 is a diagram of an overview of an example implementation 100 described herein. As shown in FIG. 1, a service provider may interact with a campaign input device (e.g., a desktop computer, a laptop computer, a mobile phone, etc.) to provide campaign information that describes parameters for deploying a toll-free data service campaign. As shown, the service provider may input information that identifies characteristics of target users to which the toll-free data service is to be provided. As further shown, the service provider may choose to use an efficiency metric to determine target users (e.g., based on revenue generated from a target user). The efficiency metric may be dynamically determined, and may be used to update target users for a toll-free data service, as described in more detail herein.

As further shown in FIG. 1, the campaign input device may provide campaign information, including the target user characteristics and the indication to use the efficiency metric, to a campaign control device (e.g., a server device). The campaign control device may deploy the campaign, and may provide an offer for toll-free data services to target users (e.g., mobile devices associated with the target users). As further shown, the campaign control device may monitor activities of the target users (e.g., browsing, purchasing, etc.), and may update an efficiency metric based on the monitored activities. The campaign control device may use the efficiency metric to control a manner in which future toll-free data service offers are provided (e.g., to add a user to a set of target users, to remove a user from a set of target users, etc.). In this way, a service provider may increase the efficiency and the effectiveness of toll-free data service campaigns.

Figure 2:
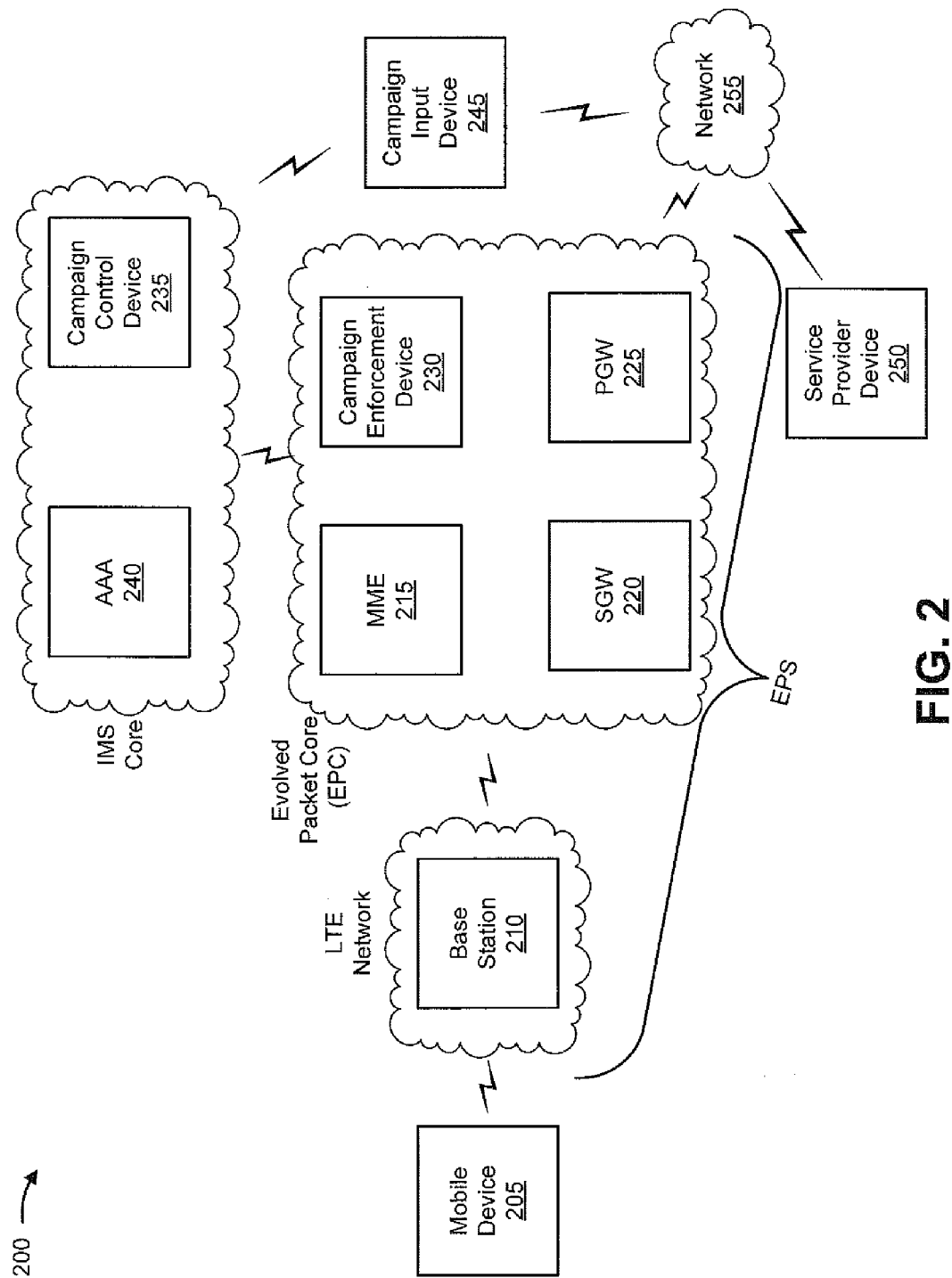
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a campaign enforcement device 230; a campaign control device 235; an authentication, authorization, and accounting server (AAA) 240; a campaign input device 245; a service provider device 250; and a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and/or campaign enforcement device 230 that enable mobile devices 205 to communicate with network 255 and/or an Internet protocol (IP) multimedia subsystem (IMS) core. The IMS core may include campaign control device 235 and/or AAA 240, and may manage device registration and authentication, session initiation, campaign information, etc., associated with mobile devices 205 and/or service provider devices 250. Campaign control device 235 and/or AAA 240 may reside in the EPC and/or the IMS core.

Mobile device 205 may include one or more devices capable of communicating with base station 210 and/or a network (e.g., network 255). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Mobile device 205 may send traffic to and/or receive traffic from network 255 (e.g., via base station 210, SGW 220, and/or PGW 225). Mobile device 205 may receive an offer for a toll-free data service, and/or may receive a toll-free data service, based on a toll-free data service campaign.

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 255 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 255 (e.g., via PGW 225) and/or other network devices associated with the EPC and/or the IMS core. SGW 220 may also receive traffic from network 255 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255, and may send the traffic to mobile device 205 via SGW 220 and base station 210. PGW 225 may record data usage information (e.g., byte usage), and may provide the data usage information to AAA 240.

Campaign enforcement device 230 may include one or more devices capable of inspecting traffic and applying one or more campaign rules to the traffic. For example, campaign enforcement device 230 may include a gateway, a router, a modem, a switch, a firewall, a NIC, a hub, a bridge, a server device, an OADM, or a similar device. Campaign enforcement device 230 may receive campaign rules from campaign control device 235, may apply the campaign rules to traffic received from PGW 225, and may instruct PGW 225 how to handle the traffic based on the campaign rules (e.g., by analyzing user profile information, an efficiency metric, etc.). Additionally, or alternatively, campaign enforcement device 230 may instruct AAA 240 how to charge for data usage associated with the traffic. Different campaign enforcement devices 230 may be associated with different geographic regions and/or cellular service areas, in some implementations.

Campaign control device 235 may include one or more devices capable of receiving, generating, storing, processing, and/or providing information associated with a toll-free data service campaign (e.g., campaign information, campaign rules, user profile information, an efficiency metric, etc.). For example, campaign control device 235 may include a server device or a similar device. Campaign control device 235 may receive campaign information from campaign input device 245, may generate campaign rules based on the campaign information, and may deploy the campaign rules to one or more campaign enforcement devices 230 (e.g., associated with one or more cellular service areas). Additionally, or alternatively, campaign control device 235 may determine target users (e.g., target mobile devices 205) to which a toll-free data service and/or an offer for a toll-free data service is to be provided, and may provide the toll-free data service and/or an offer for the toll-free data service to mobile devices 205 associated with the target users.

AAA 240 may include one or more devices, such as one or more server devices, that perform authentication, authorization, and/or accounting operations for communication sessions associated with mobile device 205. For example, AAA 240 may store data usage information for mobile device 205, for a user associated with mobile device 205, for service provider device 250, for a service provider (e.g., that provides a toll-free data service), etc.

Campaign input device 245 may include one or more devices capable of receiving, generating, storing, processing, and/or providing information associated with a toll-free data service campaign. For example, campaign input device 245 may include a desktop computer, a laptop computer, a mobile phone, a server device, or a similar device. Campaign input device 245 may receive input, from a service provider, that identifies campaign information, and may provide the campaign information to campaign control device 235.

Service provider device 250 may include one or more devices capable of providing a service (e.g., to mobile device 205), such as a toll-free data service. For example, service provider device 250 may include a server device (e.g., a host server, a web server, an application server, etc.) or a similar device. Service provider device 250 may be associated with a service provider that provides a toll-free data service, where the service provider is charged for data usage rather than an end user associated with mobile device 205.

Network 255 may include one or more wired and/or wireless networks. For example, network 255 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
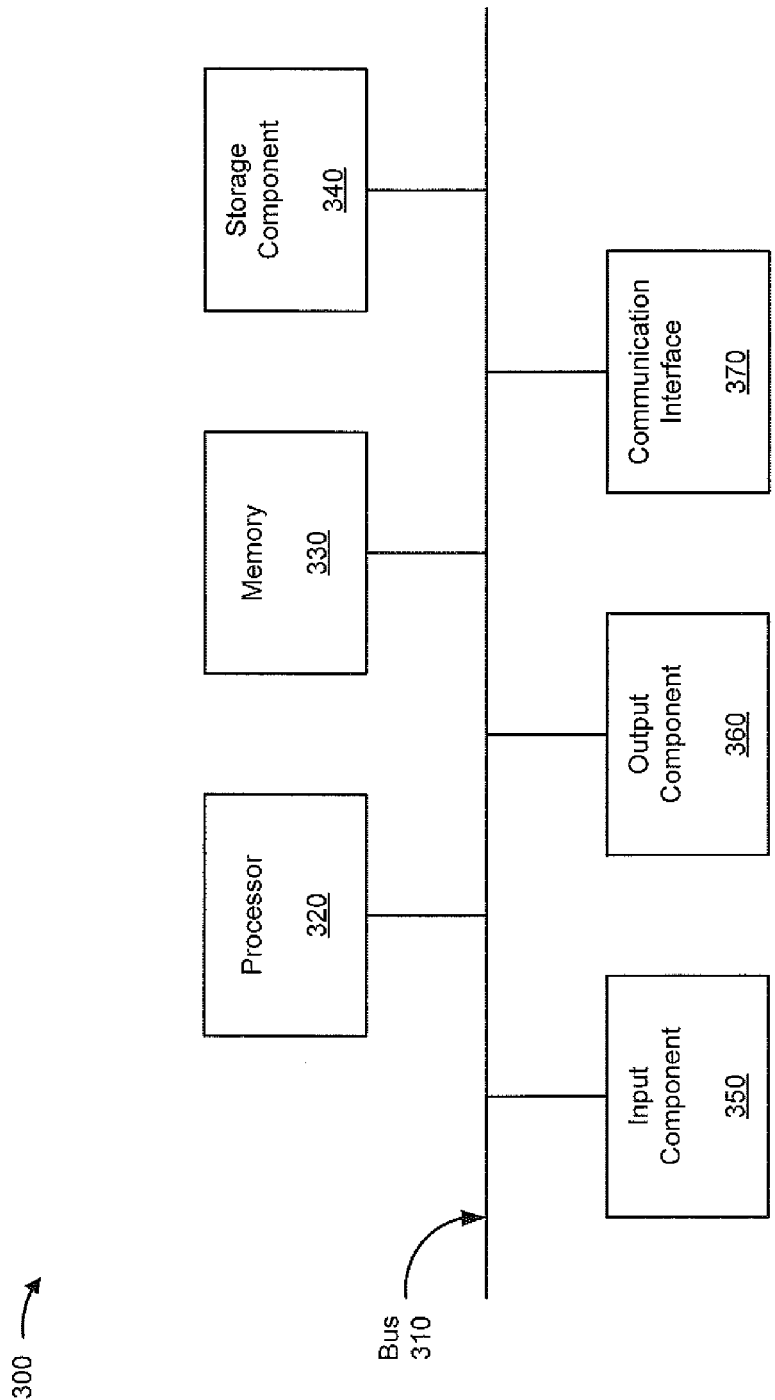
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, campaign enforcement device 230, campaign control device 235, AAA 240, campaign input device 245, and/or service provider device 250. In some implementations, mobile device 205, base station 210, MME 215, SGW 220, PGW 225, campaign enforcement device 230, campaign control device 235, AAA 240, campaign input device 245, and/or service provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
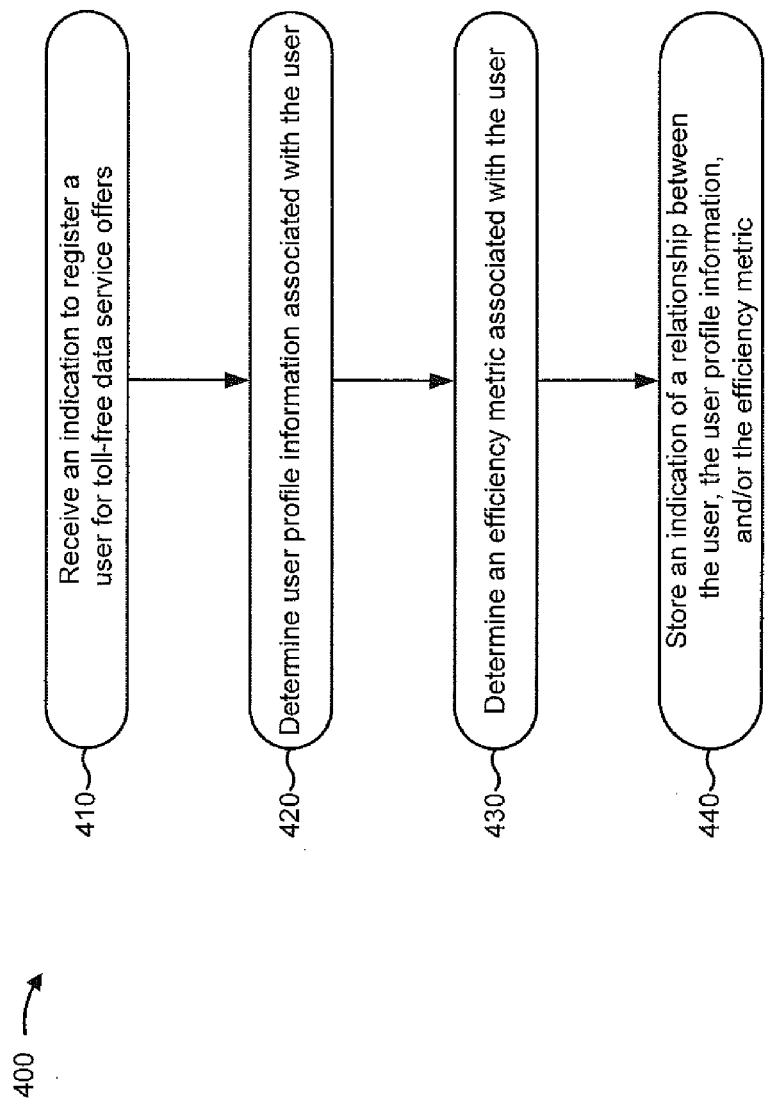
FIG. 4 is a flow chart of an example process for determining information for selectively and dynamically providing a toll-free data service.

FIG. 4 is a flow chart of an example process 400 for determining information for selectively and dynamically providing a toll-free data service. In some implementations, one or more process blocks of FIG. 4 may be performed by campaign control device 235. Additionally, or alternatively, one or more process blocks of FIG. 4 may be performed by another device or a group of devices separate from or including campaign control device 235, such as mobile device 205, base station 210, MME 215, SGW 220, PGW 225, campaign enforcement device 230, AAA 240, campaign input device 245, and/or service provider device 250.

As shown in FIG. 4, process 400 may include receiving an indication to register a user for toll-free data service offers (block 410). For example, campaign control device 235 may receive, from mobile device 205, an indication to register a user for toll-free data service offers. A toll-free data service may include a service, provided by a service provider, where the service provider agrees to be charged for data usage by users of mobile devices 205 that access a service provided by the service provider (e.g., rather than the users being charged for the data usage). For example, a toll-free data service may include a web browsing service, an online shopping service, an audio service (e.g., a radio service, a music service, etc.), a video service (e.g., a movie service), a gaming service, a social networking service, a file-sharing service, a content-providing service, or the like. A toll-free data service offer may include an offer for a toll-free data service (e.g., an offer that provides access to a toll-free data service, such as via a link, an application, a website, etc.).

In some implementations, a user may register to receive toll-free data service offers using a toll-free data service application. For example, a user may interact with mobile device 205 to download a toll-free data service application, and may interact with the toll-free data service application to register to receive toll-free data services and/or toll-free data service offers. In some implementations, the user may create a user account, and information associated with the user account may be stored (e.g., by mobile device 205, by campaign control device 235, etc.). Based on the user registration, campaign control device 235 may receive an indication that the user, and/or mobile device 205 associated with the user, has registered to receive toll-free data service offers.

As further shown in FIG. 4, process 400 may include determining user profile information associated with the user (block 420). For example, campaign control device 235 may determine user profile information associated with the user (e.g., the user that registered to receive toll-free data service offers). In some implementations, campaign control device 235 may determine the user profile information based on information input by the user during registration. Additionally, or alternatively, campaign control device 235 may determine user profile information based on information stored in a data structure accessible by campaign control device 235. Additionally, or alternatively, campaign control device 235 may receive the user profile information from another device, such as mobile device 205, MME 215, AAA 240, campaign input device 245, service provider device 250, etc. For example, campaign control device 235 may be associated with a telecommunications service provider, an Internet service provider, a television service provider, etc., and may obtain user profile information based on the user being a customer of the telecommunications, Internet, or television service provider. Campaign control device 235 may use the user profile information to determine whether to provide a toll-free data service and/or a toll-free data service offer to a user (e.g., mobile device 205 associated with the user).

User profile information may include, for example, a characteristic of the user, such as demographic information associated with the user (e.g., a user's age, a user's age range, a user's gender, a user's date of birth, a user's profession, a user's ethnic group, a user's personal interests, a user's income level, a user's address, etc.). Additionally, or alternatively, user profile information may include an event associated with a user (e.g., determined based on a user's calendar), a device activity associated with a user (e.g., an action performed by the user using mobile device 205, such as opening and/or running an application, making a purchase, etc.), device information associated with mobile device 205 (e.g., a current date and/or time associated with mobile device 205, a geographic location associated with mobile device 205, etc.), social networking information associated with a user (e.g., a list of a user's contacts stored by mobile device 205, a list of a user's contacts or friends associated with a social networking application, etc.), or the like.

As further shown in FIG. 4, process 400 may include determining an efficiency metric associated with the user (block 430). For example, campaign control device 235 may determine an efficiency metric (e.g., an advertising efficiency metric), associated with the user, to be used to determine whether to provide a toll-free data service and/or a toll-free data service offer to the user (e.g., mobile device 205 associated with the user). An efficiency metric may indicate, for example, revenue and/or profit associated with a user (e.g., as a result of providing toll-free data services to the user and/or other users in the user's demographic).

In some implementations, campaign control device 235 may determine the efficiency metric based on an amount of revenue generated from a user (e.g., based on user purchases), a quantity of revenue-generating activities performed by the user (e.g., a quantity of purchases), a cost of providing toll-free data services to the user, a quantity of bytes consumed by the user (e.g., mobile device 205) when using a provided toll-free data service, a quantity of bytes provided to mobile device 205 for the toll-free data service, an amount of profit generated from the user (e.g., revenue minus cost), or the like. As an example, campaign control device 235 may determine the efficiency metric by dividing an amount of revenue generated from a user as a result of a toll-free data service by a cost of providing the toll-free data service to the user (e.g., a quantity of data provided to the user, a cost of the quantity of data, etc.).

In some implementations, campaign control device 235 may determine the efficiency metric for a single user in association with a single service provider or multiple service providers. Additionally, or alternatively, campaign control device 235 may determine the efficiency metric for multiple users (e.g., associated with a particular set of user profile information that matches across the multiple users, associated with a particular user demographic, etc.) in association with a single service provider or multiple service providers. For example, campaign control device 235 may determine the efficiency metric for a particular user demographic.

As an example, campaign control device 235 may determine the efficiency metric for a user demographic based on revenue generated from users in the demographic per unit of toll-free data provided to users in the demographic (e.g., revenue per byte, revenue per megabyte, etc.). As another example, campaign control device 235 may determine the efficiency metric for a user demographic based on a quantity of time spent consuming a toll-free data service per unit of toll-free data provided to users in the demographic (e.g., a quantity of minutes per byte, a quantity of hours per megabyte, etc.). As yet another example, campaign control device 235 may determine the efficiency metric by dividing the revenue per unit of toll-free data by the quantity of time spent per unit of toll-free data.

As further shown in FIG. 4, process 400 may include storing an indication of a relationship between the user, the user profile information, and/or the efficiency metric (block 440). For example, campaign control device 235 may store, in a data structure, an indication of a relationship between the user (e.g., identified by a user identifier (ID)), the user profile information, and/or the efficiency metric. Additionally, or alternatively, mobile device 205 may store the indication of the relationship, and/or may provide the indication of the relationship (and/or the associated information) to campaign control device 235.

In some implementations, mobile device 205 and/or campaign control device 235 may update stored information (e.g., periodically, based on occurrence of an event, upon request, etc.). For example, a user may provide updated user profile information, and mobile device 205 and/or campaign control device 235 may receive and/or store the updated user profile information. Additionally, or alternatively, mobile device 205 may determine updated user profile information (e.g., based on an updated geographic location, based on an updated date and/or time, based on a user purchase, etc.), may store the updated user profile information, and/or may provide the updated user profile information to campaign control device 235.

Additionally, or alternatively, mobile device 205 and/or campaign control device 235 may update an efficiency metric (e.g., associated with a particular user or a set of users) based on updates to inputs used to determine the efficiency metric (e.g., a user purchase, toll-free data being provided to a user, etc.). In this way, campaign control device 205 may keep user profile information and efficiency metrics up-to-date, so that toll-free data services and/or toll-free data service offers may be provided to appropriate target users. Furthermore, campaign control device 205 may provide user profile information and/or an efficiency metric to a service provider (e.g., a device associated with the service provider), so that the service provider may use this information to target users for toll-free data services.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
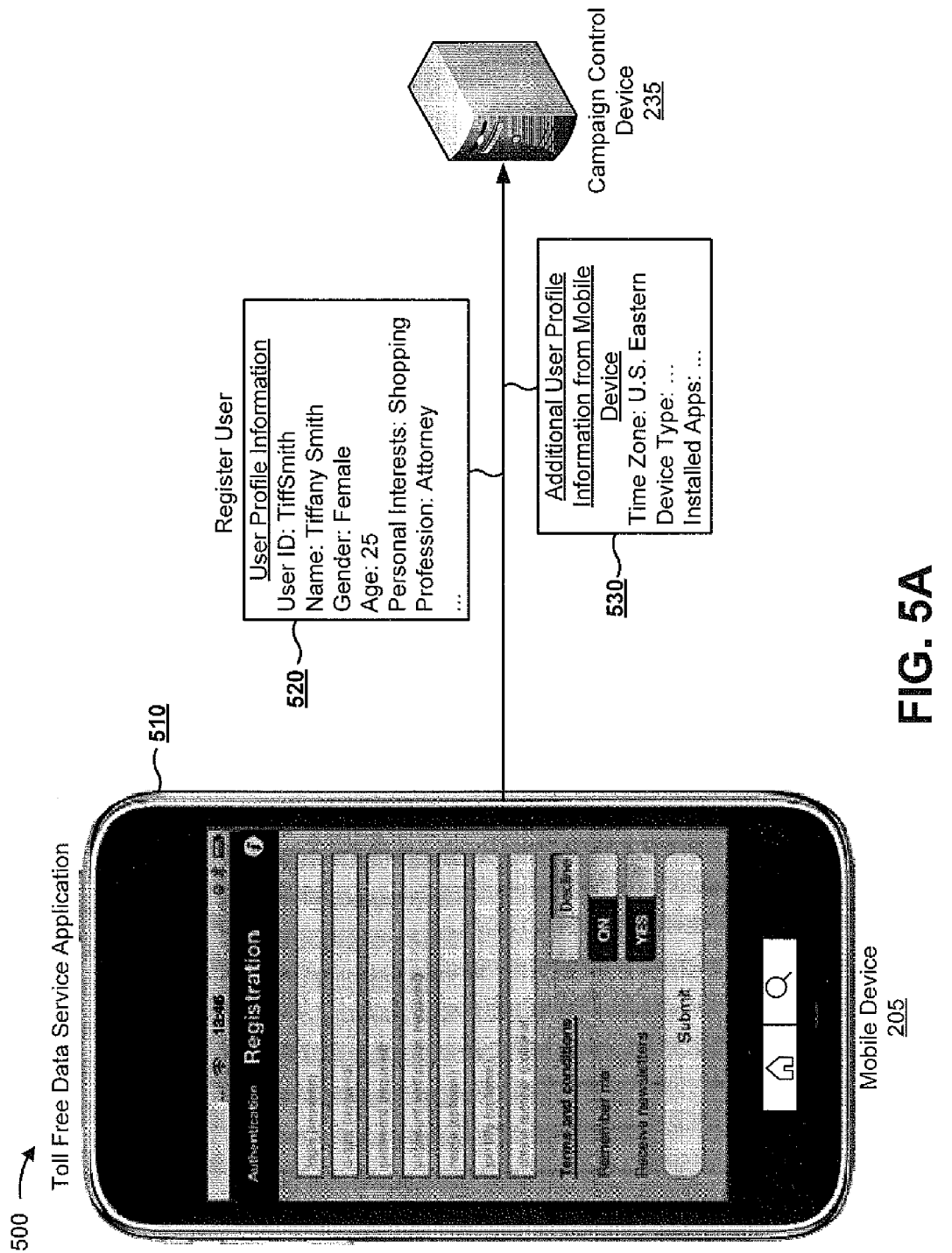
FIGS. 5A-5C are diagrams of an example implementation relating to the example process shown in FIG. 4.
Figure 5B:
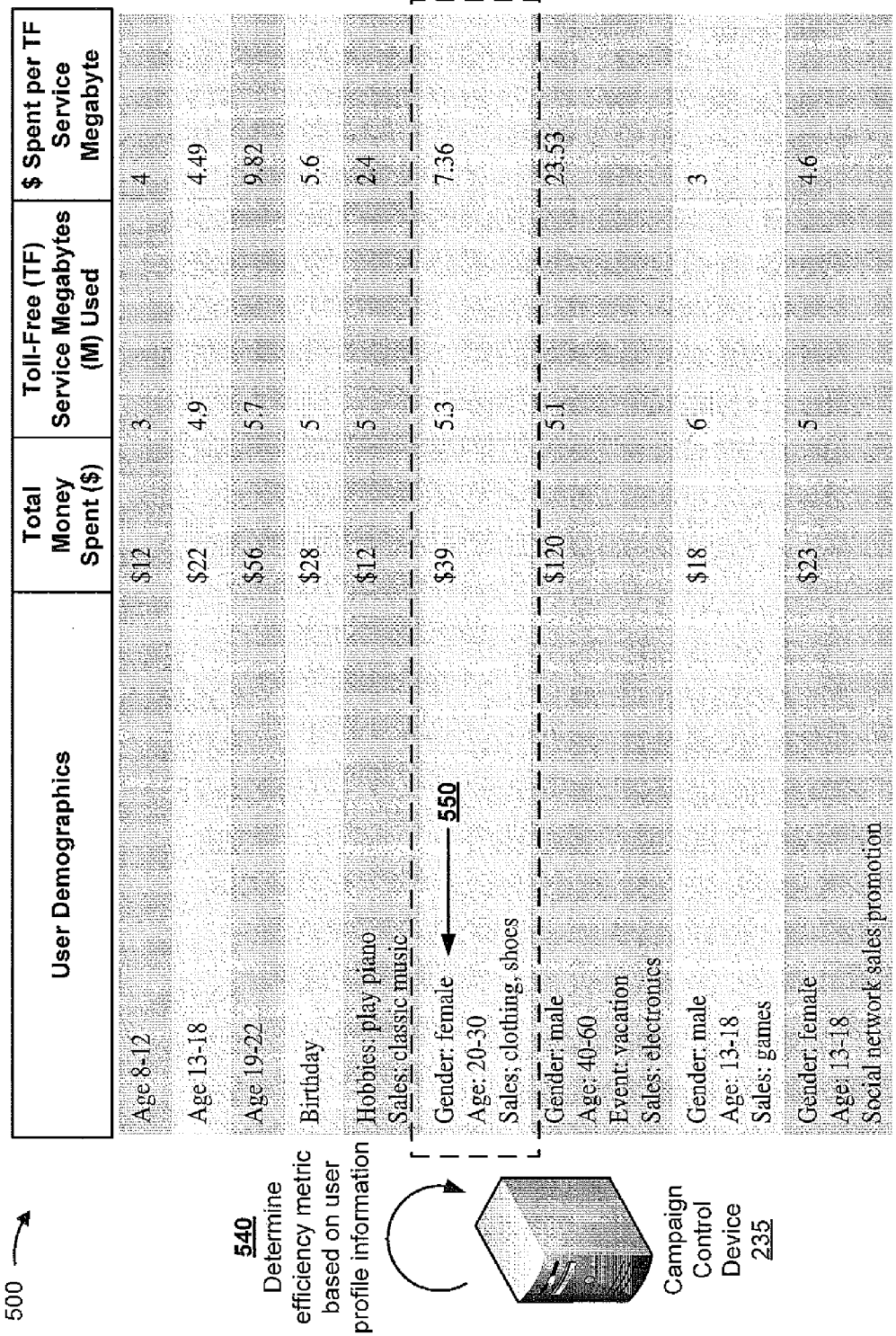
Figure 5C:
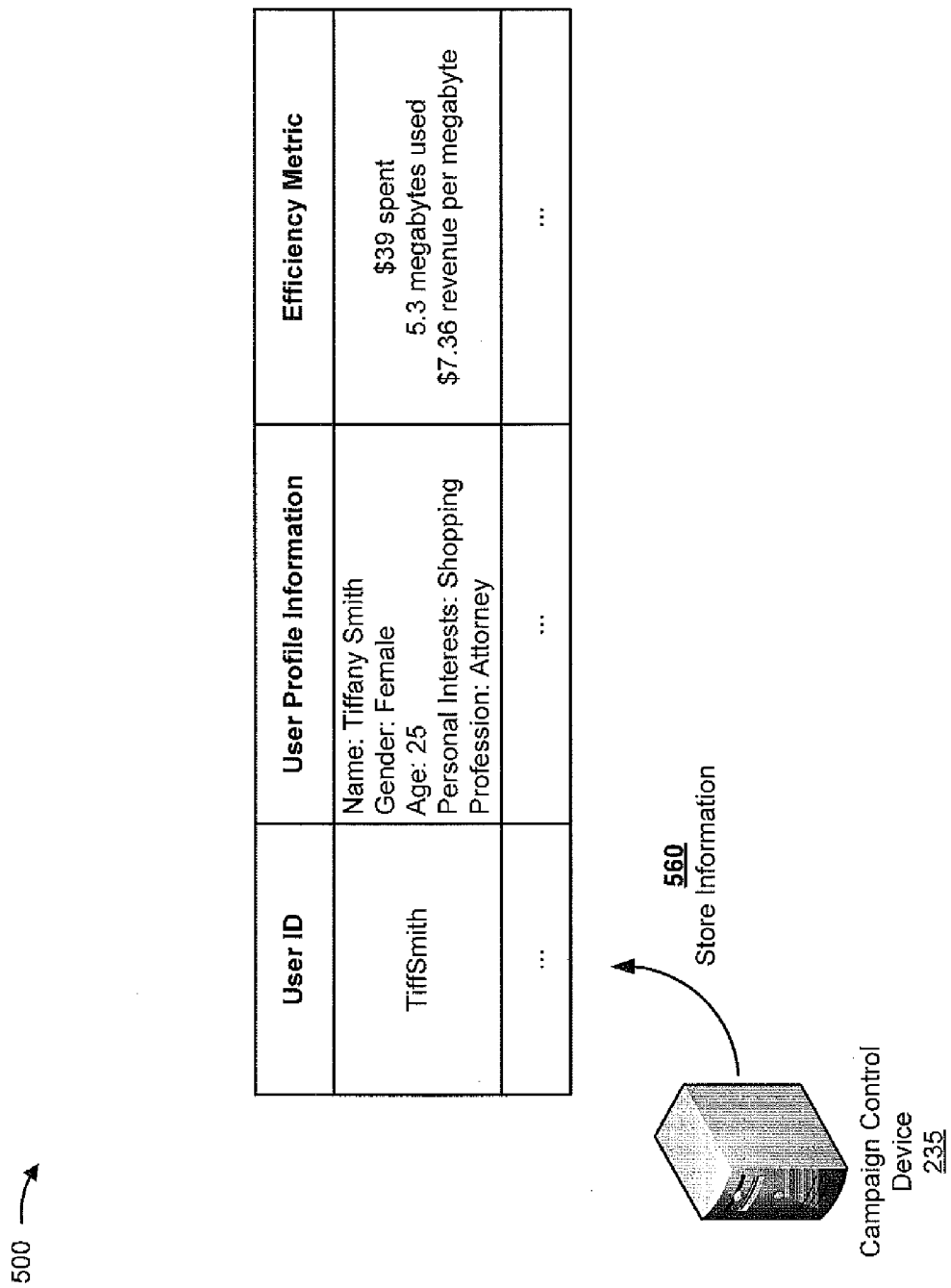

FIGS. 5A-5C are diagrams of an example implementation 500 relating to example process 400 shown in FIG. 4. FIGS. 5A-5C show an example of determining information for selectively and dynamically providing a toll-free data service.

As shown in FIG. 5A, and by reference number 510, assume that a user interacts with a toll-free data service application, executing on mobile device 205, to register for toll-free data service offers. Further, assume that the user inputs user profile information to register for a user account with the toll-free data service application. As shown by reference number 520, the user has input a user ID ("TiffSmith"), a name ("Tiffany Smith"), a gender ("Female"), an age ("25"), personal interests ("Shopping"), and a profession ("Attorney"). As shown by reference number 530, assume that mobile device 205 determines additional user profile information, such as a time zone associated with mobile device 205 ("U.S. Eastern"), a device type of mobile device 205, information that identifies applications installed on mobile device 205, etc. As shown, mobile device 205 provides the user profile information to campaign control device 235.

As shown in FIG. 5B, and by reference number 540, campaign control device 235 determines an efficiency metric based on the user profile information. In this case, assume that campaign control device 235 stores efficiency metrics associated with various user demographics, as shown. As shown by reference number 550, campaign control device 235 determines a user demographic for "TiffSmith" based on user profile information, such as a gender of female and an age between 20 and 30, and identifies efficiency metrics associated with the user demographic.

As further shown in FIG. 5B, assume that the user demographic for females between the ages of 20 and 30 spent a total of $39 and used 5.3 megabytes of toll-free data. Based on these metrics, this demographic is associated with an amount spent of $7.36 per toll-free data service megabyte. The efficiency metrics shown in FIG. 5B are provided as an example, and different efficiency metrics could be used. For example, the efficiency metrics in columns 2 through 4 could represent a total amount of money spent, a quantity of toll-free data service hours used, and an amount spent per hour of toll-free data service. In this case, assume that the user demographic for females between the ages of 20 and 30 spent a total of $39 and spent 5.3 hours consuming toll-free data. Based on these metrics, this demographic is associated with an amount spent of $7.36 per hour of toll-free data service.

As another example, the efficiency metrics in columns 2 through 4 could represent an average amount spent per megabyte, an average quantity of hours spent to consume a megabyte, and an amount spent per hour. In this case, assume that the user demographic for females between the ages of 20 and 30 spends, on average, $39 per megabyte ("M") of toll-free data provided by a particular service provider (or a group of service providers). As further shown, assume that this user demographic spends, on average, 5.3 hours to consume one megabyte of toll-free data. Based on these metrics, this user demographic is associated with an amount spent per hour metric of $7.36, determined by dividing the amount spent per megabyte ($39) by the hours spent per megabyte (5.3) (e.g., $39/5.3 hours=$7.36 per hour).

In some implementations, campaign control device 235 may sort the demographic groups based on an efficiency metric (e.g., the efficiency metric shown in column 4). A higher efficiency metric (or in some cases, a lower efficiency metric, such as a lower cost) may indicate a more valuable user to be target for a toll-free data service campaign. Campaign control device 235 may provide offers to users based on the sorted efficiency metrics. For example, campaign control device 235 could provide the top n users (or the top n user demographics), determined based on the sorted efficiency metrics, with an offer for the toll-free data service. Additionally, or alternatively, campaign control device 235 may apply campaign rules (e.g., to provide different amounts of toll-free data and/or a different quantity of toll-free data service hours) based on the sorted efficiency metrics. For example, the top 20 users could be provided with 50 megabytes of toll-free data, the next 80 users could be provided with 20 megabytes of toll-free data, and the next 900 users could be provided with 5 hours of toll-free data service. These rules may be configurable by the service provider, in some implementations.

As shown in FIG. 5C, and by reference number 560, campaign control device 235 stores a relationship between the User ID of the user ("TiffSmith"), the user profile information associated with the user, and the efficiency metrics associated with the user. In this way, campaign control device 235 may use the user profile information and the efficiency metrics to target users to be provided with a toll-free data service and/or a toll-free data service offer, as described in more detail elsewhere herein.

As indicated above, FIGS. 5A-5C are provided merely as an example. Other examples are possible and may differ from what was described with regard to FIGS. 5A-5C.

FIG. 6 is a flow chart of an example process 600 for selectively and dynamically providing a toll-free data service. In some implementations, one or more process blocks of FIG. 6 may be performed by campaign control device 235. Additionally, or alternatively, one or more process blocks of FIG. 6 may be performed by another device or a group of devices separate from or including campaign control device 235, such as mobile device 205, base station 210, MME 215, SGW 220, PGW 225, campaign enforcement device 230, AAA 240, campaign input device 245, and/or service provider device 250.

As shown in FIG. 6, process 600 may include receiving campaign information associated with a toll-free data service (block 610). For example, campaign control device 235 may receive campaign information for deploying a toll-free data service campaign. A toll-free data service campaign (sometimes referred to herein as a campaign) may refer to a campaign by a service provider where the service provider agrees to be charged for data usage by users of mobile devices 205 that access a service provided by the service provider. In some implementations, an employee associated with a service provider may input campaign information using campaign input device 245, and campaign input device 245 may provide the campaign information to campaign control device 235.

Campaign information may include, for example, information that identifies a service provider associated with a campaign (e.g., associated with a toll-free data service), information that identifies one or more service provider devices 250 that provide a service associated with the campaign, information that identifies one or more geographic regions associated with the campaign (e.g., associated with one or more campaign enforcement devices 230), information that identifies a time period during which the campaign is active, information that identifies an amount of data (e.g., in bytes) that the service provider will pay for during the campaign (e.g., a maximum amount of data), information that identifies a uniform resource locator (URL) via which a toll-free data service can be accessed for the campaign, etc.

Additionally, or alternatively, the campaign information may include information for identifying target users to be provided with a toll-free data service and/or a toll-free data service offer. For example, the campaign information may identify particular users to which a toll-free data service offer is to be provided, may indicate that the user's contacts (e.g., phone contacts, social networking contacts, email contacts, etc.) are to be provided a toll-free data service offer, may identify user profile information (e.g., a particular user demographic, etc.) of users to which the toll-free data service offer is to be provided, may identify an efficiency metric to be used to determine whether to provide a toll-free data service offer to a user, may identify a threshold value for the efficiency metric, may identify a campaign rule for controlling a manner in which users are provided toll-free data services, etc.

As further shown in FIG. 6, process 600 may include determining a set of campaign rules for providing the toll-free data service to a user (block 620). For example, campaign control device 235 may determine a set of campaign rules for providing the toll-free data service to a user. In some implementations, a campaign rule may instruct campaign enforcement device 230 how to handle network traffic associated with the toll-free data service. For example, a campaign rule may specify one or more conditions for charging a service provider for data used by mobile device 205 to access a toll-free data service. Campaign control device 235 may provide the campaign rules to campaign enforcement device 230, in some implementations.

In some implementations, a campaign rule may specify whether a particular user is to be provided a toll-free data service (e.g., and/or an offer for a toll-free data service). For example, a campaign rule may specify that a user with a user profile that matches a set of user profile criteria (e.g., determined based on campaign information provided by a service provider) is to be provided a toll-free data service. Additionally, or alternatively, a campaign rule may specify that a user associated with a particular efficiency metric value (e.g., a value that satisfies a threshold) is to be provided a toll-free data service.

A campaign rule may specify an amount of toll-free data to be provided to a user (e.g., based on user profile information, an efficiency metric, etc.), in some implementations. Additionally, or alternatively, a campaign rule may specify when or how often a user is to be provided a toll-free data service (e.g., based on user profile information, an efficiency metric, etc.). In some implementations, campaign controller device 235 may assign weights to items of user profile information and/or efficiency metrics, and/or may use a combination of items of user profile information and/or efficiency metrics (e.g., weighted or unweighted) to determine whether to provide a toll-free data service to a user, how much toll-free data to provide to a user, when to provide a toll-free data service to a user, how often to provide a toll-free data service to a user, a time period during which to provide a toll-free data service to a user, a length of time that a toll-free data service is to be provided to a user, etc. For example, campaign control device 235 may assign scores to items of user profile information and/or efficiency metrics, may combine the scores to generate a combined score, and may compare the combined score to a threshold.

As further shown in FIG. 6, process 600 may include determining user profile information and/or an efficiency metric associated with the user (block 630), and determining whether the set of campaign rules are satisfied (block 640). For example, campaign control device 235 may determine user profile information and/or an efficiency metric associated with a user to potentially be provided a toll-free data service offer. For example, a set of users may register to receive toll-free data service offers, and a service provider may provide campaign information that identifies target users based on user profile information and/or an efficiency metric. Campaign control device 235 may determine whether to provide a toll-free data service offer to a particular user, in the set of users, based on whether user profile information and/or an efficiency metric, associated with the particular user, satisfies the set of campaign rules. In some implementations, campaign control device 235 may determine the user profile information and/or the efficiency metric based on information stored in a data structure, as described above in connection with block 440 of FIG. 4.

For example, campaign control device 235 may determine whether user profile information, associated with the user, matches user profile information specified by the campaign information input by the service provider. In some implementations, a campaign rule may specify that if a user profile, for a user, matches particular user profile parameters, then the user is to be provided a particular toll-free data service. For example, if the user profile indicates that the user is a male between the ages of 16 and 24, then the user is to be provided with a toll-free data service that permits the user to watch an action movie, and charges a toll-free service provider for data usage while the user is watching the action movie. In this case, campaign control device 235 may provide an offer for the action movie to a mobile device 205 associated with the user whose user profile indicates that the user is a male between the ages of 16 and 24. As another example, campaign control device 235 may determine that users with user profile parameters of females between the ages of 20 and 30, with an interest in shopping, are to be provided with an offer to browse a particular shopping website, and the provider of the shopping website may be charged for data usage while the user is browsing the shopping website.

As another example, campaign control device 235 may determine whether an efficiency metric, associated with the user, satisfies a threshold specified by the campaign information input by the service provider. Additionally, or alternatively, campaign control device 235 may use a combination of user profile information, associated with a user, and an efficiency metric, associated with the user, to determine whether to provide a toll-free data service to a user. In some implementations, campaign control device 235 may generate a score, for the user, based on the user profile information comparison (e.g., based on determining whether user profile information matches user profile information specified by the campaign information input by the service provider) and/or based on the efficiency metric. Campaign control device 235 may use this score to determine whether the user is a target user.

Additionally, or alternatively, campaign control device 235 may determine whether one or more campaign rules are satisfied, as described above in connection with block 620. For example, campaign control device 235 may provide a toll-free data service (e.g., and/or a toll-free data service offer) to a first user associated with an efficiency metric that satisfies a threshold, and may not provide the toll-free data service to a second user associated with an efficiency metric that does not satisfy the threshold. Additionally, or alternatively, campaign control device 235 may compare efficiency metrics associated with multiple users, and may determine a set of users to be provided the toll-free data service based on the comparison. For example, campaign control device 235 may provide the toll-free data service to a first user associated with a higher (or lower) efficiency metric than a second user, and may not provide the toll-free data service to the second user.

As another example, campaign control device 235 may determine an amount of toll-free data to provide to a user based on whether an efficiency metric, associated with the user, satisfies a threshold. Additionally, or alternatively, campaign control device 235 may determine an amount of toll-free data to provide to a user based on comparing an efficiency metric, associated with the user, to another efficiency metric associated with another user. For example, campaign control device 235 may provide a first amount of toll-free data to a first user associated with a first efficiency metric that satisfies a threshold and/or that is greater than (or less than) a second efficiency metric associated with a second user. Campaign control device 235 may provide a second amount of toll-free data to the second user.

As further shown in FIG. 6, if the set of campaign rules is not satisfied (block 640—NO), then process 600 may include not providing an offer, for the toll-free data service, to the user (block 650). For example, if campaign control device 235 determines that the set of campaign rules is not satisfied (e.g., by the user profile information and/or the efficiency metric) for a particular user, then campaign control device 235 may not provide a toll-free data service offer to the particular user (e.g., to mobile device 205 associated with the particular user). In this way, campaign control device 235 may prevent users, who are not in a target audience of a service provider's toll-free data service campaign, from receiving a toll-free data service.

As further shown in FIG. 6, if the set of campaign rules is satisfied (block 640—YES), then process 600 may include providing an offer, for the toll-free data service, to the user (block 660). For example, if campaign control device 235 determines that the set of campaign rules is satisfied (e.g., by the user profile information and/or the efficiency metric) for a particular user, then campaign control device 235 may provide a toll-free data service offer to the particular user (e.g., to mobile device 205 associated with the particular user).

In some implementations, campaign control device 235 may verify whether the set of campaign rules are satisfied before providing a toll-free data service offer to mobile device 205. Additionally, or alternatively, campaign control device 235 may provide a toll-free data service offer to mobile device 205, and mobile device 205 may determine whether the set of campaign rules are satisfied. In this case, mobile device 205 may provide the offer (e.g., for display) and/or may permit a user to access the offer when the set of rules are satisfied, and may not provide the offer (e.g., for display) and/or may prevent a user from accessing the offer when the set of rules are not satisfied.

Campaign control device 235 may provide the toll-free data service offer to mobile device 205 via a toll-free data service application, in some implementations. Additionally, or alternatively, campaign control device 235 may provide the toll-free data service via an e-mail, a text message, or the like. Mobile device 205 may provide the toll-free data service offer for display, and may provide an input mechanism (e.g., a button, a link, etc.) to permit a user to access a toll-free data service associated with the toll-free data service offer. The user may interact with the input mechanism, which may cause mobile device 205 to transmit a request for the toll-free data service to campaign enforcement device 230.

Campaign enforcement device 230 may receive the request, and may determine whether user profile information and/or an efficiency metric, associated with the user, satisfies a set of campaign rules. For example, campaign enforcement device 230 may receive the request via a hypertext transfer protocol (HTTP) request, an HTTP secure (HTTPS) request, or the like. The request may include a campaign identifier (e.g., in a header of the request, in a body of the request, etc.), and may include a user identifier (e.g., an account identifier, a mobile device identifier, etc.). Campaign enforcement device 230 may identify user profile information and/or an efficiency metric associated with the user identifier, and may identify a set of campaign rules associated with the campaign identifier. Campaign enforcement device 230 may use the user profile information and/or the efficiency metric to determine whether the set of rules is satisfied. Additionally, or alternatively, campaign enforcement device 230 may check the mobile device identifier against a list of mobile device identifiers that identify mobile devices 205 to which toll-free data service offers were sent.

If the set of campaign rules are satisfied, then campaign enforcement device 230 may provide the toll-free data service to mobile device 205 (e.g., may provide the service via a first URL that causes data usage to be charged to the service provider). Otherwise, campaign enforcement device 230 may prevent the toll-free data service from being provided to mobile device 205 (e.g., may provide the service via a second URL that causes data usage to be charged to the user, may prevent the service from being provided at all, etc.). In this way, campaign control device 235 and campaign enforcement device 230 may permit a service provider to selectively target users for a toll-free data service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of selectively and dynamically providing a toll-free data service. For the purpose of FIGS. 7A-7D, assume that the operations described herein with respect to FIGS. 5A-5C have been performed.

Figure 7A:
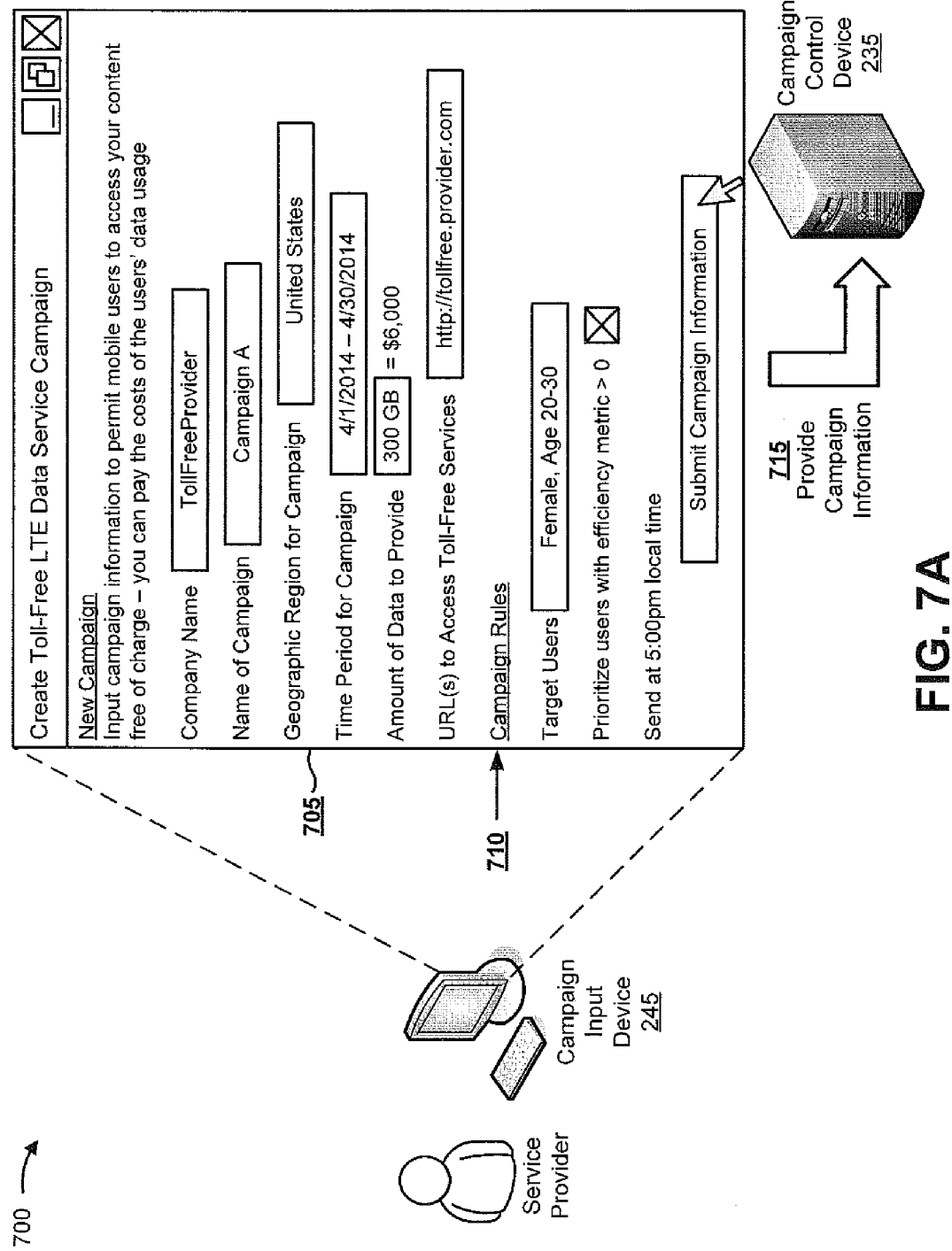
FIGS. 7A-7D are diagrams of an example implementation relating to the example process shown in FIG. 6.

As shown in FIG. 7A, and by reference number 705, assume that a service provider interacts with campaign input device 245 to input campaign information to create a toll-free LTE data service campaign. As shown, assume that the service provider identifies a name of the service provider, shown as "TollFreeProvider," a name of the campaign (e.g., a campaign identifier), shown as "Campaign A," a geographic region for the campaign, shown as "United States," a time period for the campaign, shown as "Apr. 1, 2014-Apr. 30, 2014," an amount of data to be provided with the campaign, shown as "300 gigabytes (GB)," which corresponds to a payment of $6,000 by the service provider, and a URL to access the toll-free data service, shown as "http://tollfree.provider.com." In some cases, a service provider may create multiple toll-free data campaigns to be provided to users at the same time. Furthermore, toll-free data campaigns for multiple service providers may be provided to users at the same time.

As shown by reference number 710, assume that the service provider provides information associated with determining whether to provide the toll-free data service to a user. For example, assume that the service provider inputs a user demographic of females between the ages of 20 and 30, selects an option to prioritize users with an efficiency metric that is greater than zero, and inputs an instruction to provide the toll-free data service offer at 5:00 pm local time (e.g., a local time of mobile device 205 associated with a user). As further shown, assume that the service provider interacts with an input mechanism, shown as a "Submit Campaign Information" button, to cause campaign input device 245 to provide the campaign information to campaign control device 235, as shown by reference number 715.

Figure 7B:
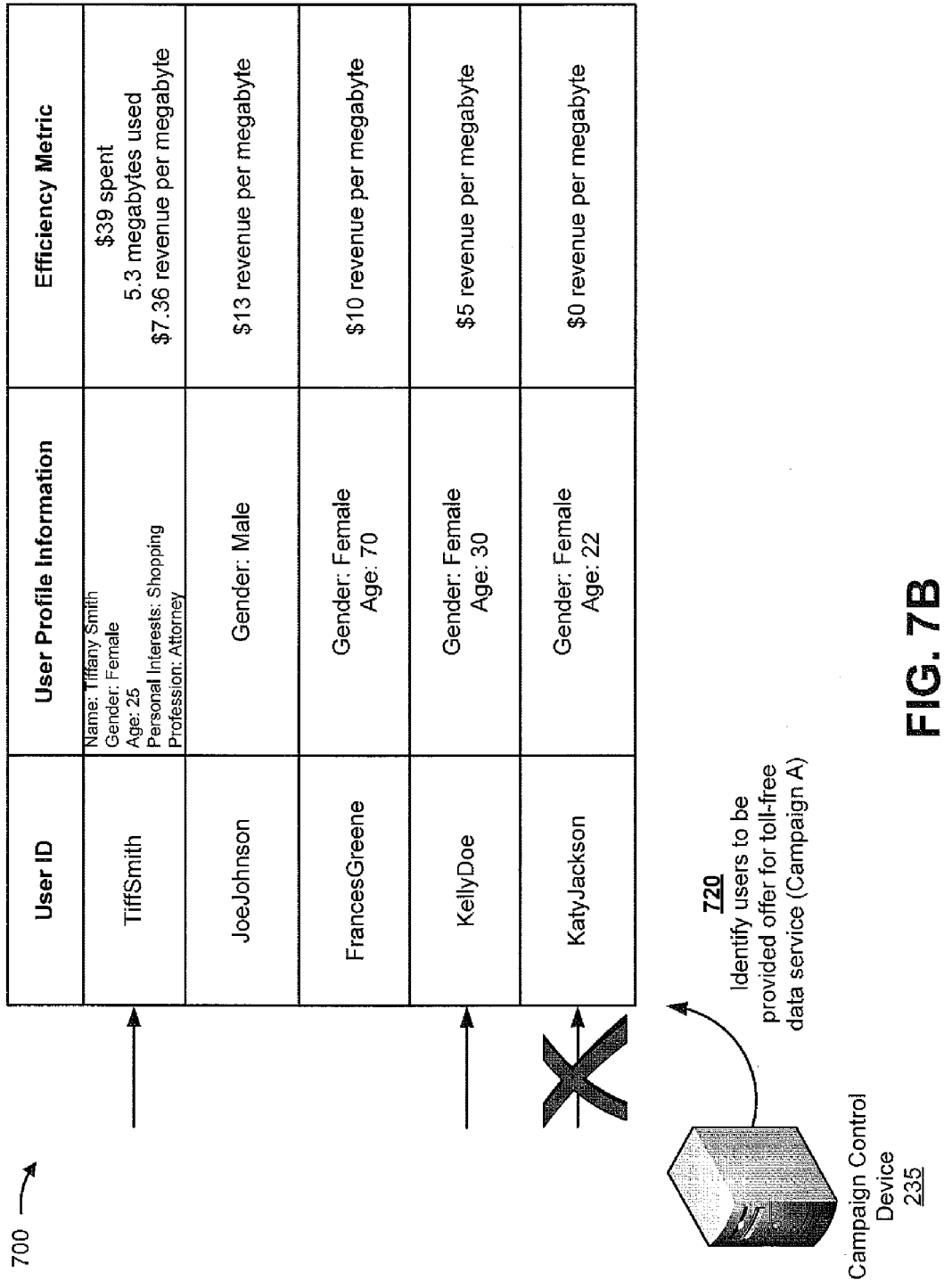

As shown in FIG. 7B, and by reference number 720, assume that campaign control device 235 identifies users to be provided an offer for a toll-free data service associated with Campaign A. For example, campaign control device 235 determines to provide the toll-free data service offer to two users, a user with a User ID of "TiffSmith" and a user with a User ID of "KellyDoe," because these two users are in the target demographic (e.g., females between the age of 20 and 30) and because these two users have an efficiency metric that is greater than a threshold of zero.

As another example, and as further shown, campaign control device 235 determines not to provide the toll-free data service offer to a user with a User ID of "KatyJackson" because this user is associated with an efficiency metric of zero. Finally, campaign control device 235 determines not to provide the toll-free data service to a user with a User ID of "JoeJohnson" and a user with a User ID of "FrancesGreene" because these users are not in the target demographic.

Figure 7C:
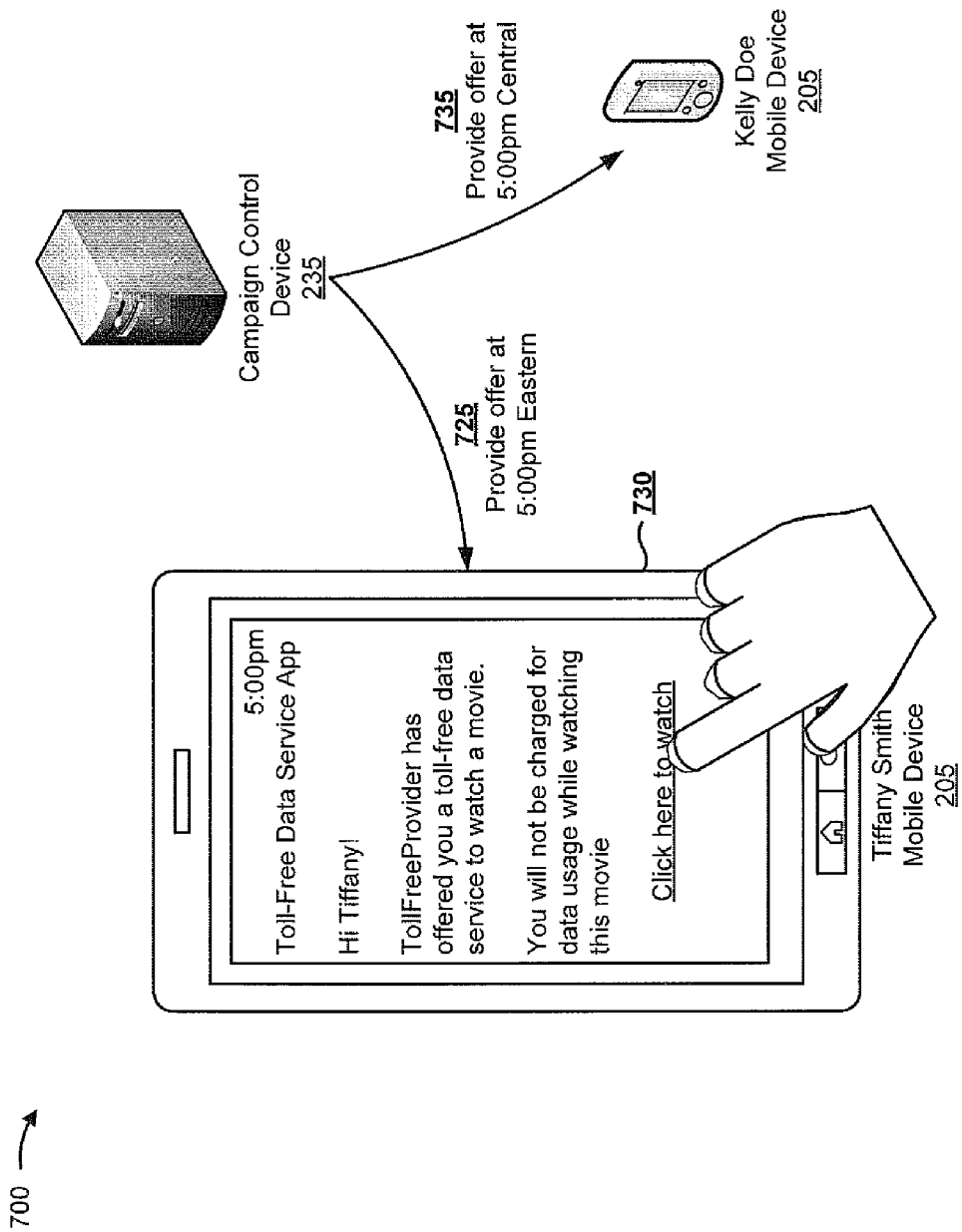

As shown in FIG. 7C, and by reference number 725, campaign control device 235 provides the toll-free data service offer to mobile device 205, associated with "TiffSmith," at 5:00 pm Eastern time (in this case, assume that user "TiffSmith" is located in the Eastern time zone). As shown by reference number 730, mobile device 205 provides the toll-free data service offer for display via the toll-free data service application. As shown, the toll-free data service offer indicates that a service provider, shown as "TollFreeProvider," has offered "TiffSmith" a toll-free data service to watch a movie, and further indicates that "TiffSmith" will not be charged for data usage while watching the movie. As further shown, the toll-free data service offer provides an input mechanism for the user to access the toll-free data service (e.g., a link that display "Click here to watch").

As shown by reference number 735, campaign control device 235 provides the toll-free data service offer to mobile device 205, associated with "KellyDoe," at 5:00 pm Central time (in this case, assume that user "KellyDoe" is located in the Central time zone). In this way, a service provider may control users to whom a toll-free data service is provided, and a manner in which the toll-free data service is provided to each user.

Figure 7D:
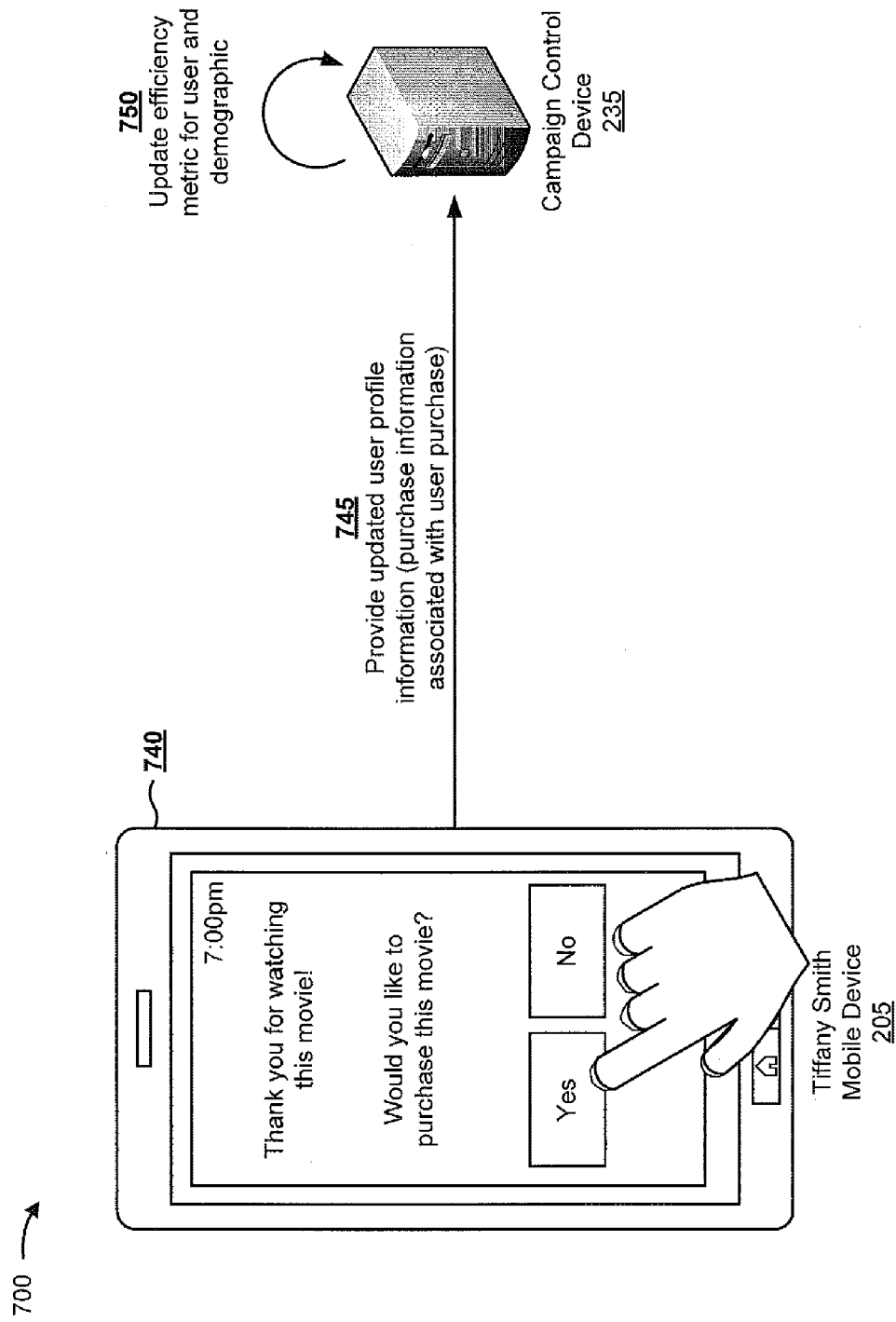

As shown in FIG. 7D, and by reference number 740, assume that the user has finished watching the movie, and provides input to purchase the movie. Based on the user purchase, mobile device 205 (and/or a device associated with processing the purchase) provides updated user profile information (e.g., purchase information) to campaign control device 235, as shown by reference number 745. The updated user profile information may include, for example, an indication that "TiffSmith" purchased the movie, an amount of revenue generated from the purchase (e.g., a price paid by the user), an amount of time that "TiffSmith" spent consuming toll-free data before purchasing the movie, a quantity of bytes of toll-free data consumed by mobile device 205 before the movie was purchased, or the like.

As shown by reference number 750, campaign control device 235 uses the updated user profile information to update an efficiency metric. Campaign control device 235 may update an efficiency metric associated with this particular user, "TiffSmith," and/or may update an efficiency metric associated with one or more user demographics to which "TiffSmith" belongs. In this way, campaign control device 235 may use the updated user profile information and/or the update efficiency metric to determine users to whom a toll-free data service is provided in the future, and a manner in which the toll-free data service is provided to a user in the future.

As indicated above, FIGS. 7A-7D are provided merely as an example. Other examples are possible and may differ from what was described with regard to FIGS. 7A-7D.

Implementations described herein assist in targeting particular users to be provided with a toll-free data service, determining a toll-free data service to be provided to a particular user, and dynamically adjusting a set of target users for a toll-free data service.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive campaign information associated with a toll-free data service,
      the campaign information including information associated with target users to be provided with an offer for the toll-free data service;
   determine, based on the campaign information, a campaign rule for providing the offer for the toll-free data service to a first mobile device associated with a first user,
      the campaign rule identifying a condition for charging a service provider, associated with the toll-free data service, for data used by the first mobile device in association with the toll-free data service;
   determine a first efficiency metric associated with the first user,
      the first efficiency metric being determined as a result of providing the toll-free data service or another toll-free data service to the first user or to a set of users;
   compare the first efficiency metric and a second efficiency metric, associated with a second user, based on the campaign rule,
      the second user being different from the first user;
   provide a first amount of toll-free data to the first mobile device based on comparing the first efficiency metric and the second efficiency metric; and
   provide a second amount of toll-free data to a second mobile device, associated with the second user, based on comparing the first efficiency metric and the second efficiency metric,
      the second mobile device being different from the first mobile device, and
      the second amount of toll-free data being different from the first amount of toll-free data.

2. The device of claim 1, where the one or more processors, when determining the campaign rule, are to:
   determine a threshold value associated with the first efficiency metric;
   where the one or more processors are further to:
      compare the first efficiency metric to the threshold value; and
   where the one or more processors, when providing the first amount of toll-free data to the first mobile device, are to:
      provide the first amount of toll-free data to the first mobile device based on comparing the first efficiency metric to the threshold value.

3. The device of claim 1,
   where the one or more processors are further to:
      determine that the first efficiency metric satisfies a threshold value;
   where the one or more processors, when providing the first amount of toll-free data to the first mobile device, are to:
      provide the first amount of toll-free data to the first mobile device, associated with the first user, based on determining that the first efficiency metric satisfies the threshold value; and
   where the one or more processors are further to:
      determine that the second efficiency metric, associated with the second user, does not satisfy the threshold value; and
      prevent the toll-free data service from being provided to the second mobile device based on determining that the second efficiency metric does not satisfy the threshold value.

4. The device of claim 1, where the first efficiency metric indicates a revenue or a profit, associated with the first user or a user demographic to which the first user belongs, generated based on providing the first amount of toll-free data.

5. The device of claim 1, where the one or more processors are further to:
   provide the offer for the toll-free data service to the first mobile device;
   receive acceptance of the offer for the toll-free data service; and
   where, when providing the first amount of toll-free data to the first mobile device, the one or more processors are to:

provide the first amount of toll-free data to the first mobile device after receiving the acceptance of the offer.

6. The device of claim 1, where the one or more processors are further to:
receive purchase information associated with a purchase made by the first user, in association with the first amount of toll-free data, based on providing the first amount of toll-free data to the first mobile device; and
update the first efficiency metric based on the purchase information.

7. The device of claim 1, where the one or more processors are further to:
determine user profile information,
the user profile information being part of a user profile and identifying a characteristic associated with the first user, and
the user profile information being different from the first efficiency metric; and
analyze the user profile information, based on the campaign rule, to determine the first amount of toll-free data.

8. A computer-readable medium storing instructions, the instructions comprising:
one or more instructions that, when executed by one or more processors, cause the one or more processors to:
receive campaign information associated with a toll-free data service,
the campaign information including information associated with target users to be provided with an offer for the toll-free data service;
determine, based on the campaign information, a campaign rule for providing the offer for the toll-free data service to a first mobile device associated with a first user,
the campaign rule identifying a condition for providing the offer for the toll-free data service to the first mobile device associated with the first user;
determine a first efficiency metric associated with the first user,
the first efficiency metric being determined based on information associated with providing the toll-free data service or another service to one or more users;
compare the first efficiency metric and a second efficiency metric, associated with a second user, based on the campaign rule,
the second user being different from the first user;
provide a first amount of toll-free data to the first mobile device based on comparing the first efficiency metric and the second efficiency metric; and
provide a second amount of toll-free data to a second mobile device, associated with the second user, based on comparing the first efficiency metric and the second efficiency metric,
the second mobile device being different from the first mobile device, and
the second amount of toll-free data being different from the first amount of toll-free data.

9. The computer-readable medium of claim 8, where the one or more instructions, when executed by the one or more processors, cause the one or more processors to:
compare the first efficiency metric to a threshold value; and
where the one or more instructions, when providing the first amount of toll-free data to the first mobile device, cause the one or more processors to:
selectively provide the first amount of toll-free data to the first mobile device based on comparing the first efficiency metric to the threshold value,
the first amount of toll-free data being provided to the first mobile device when the first efficiency metric satisfies the threshold value, and
the first amount of toll-free data not being provided to the first mobile device when the first efficiency metric does not satisfy the threshold value.

10. The computer-readable medium of claim 8, where the one or more instructions, when receiving the campaign information, cause the one or more processors to:
receive information that identifies the first efficiency metric to be used to determine whether to provide the first amount of toll-free data.

11. The computer-readable medium of claim 8, where the one or more instructions, when executed by the one or more processors, further cause the one or more processors to:
determine user profile information,
the user profile information being part of a user profile and identifying a characteristic associated with the first user, and
the user profile information being different from the first efficiency metric;
analyze the user profile information based on the campaign rule; and
where the one or more instructions, when providing the first amount of toll-free data to the first mobile device, cause the one or more processors to:
provide the first amount of toll-free data to the first mobile device when the user profile information matches user profile parameters identified by the campaign rule and when the first efficiency metric satisfies the condition.

12. The computer-readable medium of claim 8, where the first efficiency metric is associated with a revenue or a profit generated as a result of providing the toll-free data service or the other service to the one or more users,
the one or more users including the first user or a group of users associated with a user demographic to which the first user belongs.

13. The computer-readable medium of claim 8, where the first efficiency metric is associated with a cost of providing the toll-free data service or the other service to the one or more users.

14. The computer-readable medium of claim 8, where the one or more instructions, when executed by the one or more processors, further cause the one or more processors to:
receive purchase information associated with a purchase made by the first user based on providing the first amount of toll-free data to the first mobile device;
update the first efficiency metric based on the purchase information; and
provide a third amount of toll-free data, to the first mobile device, associated with the first user, or to another mobile device associated with another user, based on updating the first efficiency metric.

15. A method, comprising:
determining, by a device, a campaign rule for providing a toll-free data service to a first mobile device associated with a first user,
the campaign rule identifying a condition for charging a service provider, associated with the toll-free data service, for data used by the first mobile device in association with the toll-free data service,
determining, by the device, a first efficiency metric associated with the first user, the first efficiency metric being determined based on providing one or more toll-free data services to one or more users,
the one or more users including the first user or a set of users associated with a demographic with which the first user belongs;
comparing, by the device, the first efficiency metric and a second efficiency metric, associated with a second user, based on the campaign rule,
the second user being different from the first user;
providing, by the device, a first amount of toll-free data to the first mobile device based on analyzing the first efficiency metric and the second efficiency metric; and
providing, by the device, a second amount of toll-free data to a second mobile device, associated with the second user, based on comparing the first efficiency metric and the second efficiency metric,
the second mobile device being different from the first mobile device, and
the second amount of toll-free data being different from the first amount of toll-free data.

16. The method of claim 15, where determining the campaign rule comprises:
determining the campaign rule based on campaign information that identifies information associated with target users to be provided with the toll-free data service.

17. The method of claim 15, where the first efficiency metric is associated with a quantity of data consumed by or provided to the first mobile device.

18. The method of claim 15,
where the method further comprises:
receiving purchase information associated with a purchase made by the first user, based on providing the first amount of toll-free data to the first mobile device; and
updating the first efficiency metric based on the purchase information.

19. The method of claim 15, where the first efficiency metric is associated with a cost of providing the one or more toll-free data services to the one or more users.

20. The method of claim 15, further comprising:
determining user profile information,
the user profile information being part of a user profile and identifying a characteristic associated with the first user, and
the user profile information being different from the first efficiency metric;
analyzing the user profile information based on the campaign rule; and
where providing the first amount of toll-free data to the first mobile device includes:
providing the first amount of toll-free data to the first mobile device when the user profile information matches user profile parameters identified by the campaign rule and when the first efficiency metric satisfies the condition.

* * * * *